United States Patent
Sgobba et al.

(10) Patent No.: US 11,558,451 B2
(45) Date of Patent: Jan. 17, 2023

(54) MACHINE LEARNING BASED APPLICATION DEPLOYMENT

(71) Applicant: International Business Machines Corporation, Armonk, NY (US)

(72) Inventors: Nicolo' Sgobba, Bratislava (SK); Erik Rueger, Ockenheim (DE); Nadiya Kochura, Bolton, MA (US); Michal Paluch, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 17/234,650

(22) Filed: Apr. 19, 2021

(65) Prior Publication Data
US 2022/0345518 A1    Oct. 27, 2022

(51) Int. Cl.
| | |
|---|---|
| H04L 67/10 | (2022.01) |
| H04L 41/16 | (2022.01) |
| G06N 3/08 | (2006.01) |
| G06N 3/04 | (2006.01) |
| H04L 41/50 | (2022.01) |
| H04L 41/5019 | (2022.01) |
| H04L 43/08 | (2022.01) |

(52) U.S. Cl.
CPC ............ *H04L 67/10* (2013.01); *G06N 3/04* (2013.01); *G06N 3/08* (2013.01); *H04L 41/16* (2013.01); *H04L 41/5019* (2013.01); *H04L 41/5096* (2013.01); *H04L 43/08* (2013.01)

(58) Field of Classification Search
CPC ......... H04L 67/01; H04L 67/10; H04L 67/34; H04L 41/16
See application file for complete search history.

(56) References Cited

U.S. PATENT DOCUMENTS

| | | | |
|---|---|---|---|
| 9,531,604 B2 | 12/2016 | Akolkar | |
| 10,129,177 B2 | 11/2018 | Chang | |
| 10,235,209 B2 | 3/2019 | Whipple | |
| 10,282,222 B2 | 5/2019 | Thakkar | |
| 10,530,650 B2 | 1/2020 | Thakkar | |
| 10,990,370 B1* | 4/2021 | Bawcom | H04L 41/0895 |
| 11,153,394 B1* | 10/2021 | Eberlein | H04L 67/10 |
| 2015/0341240 A1 | 11/2015 | Iyoob | |
| 2019/0253485 A1* | 8/2019 | Jyoti Banerjee | H04L 67/1001 |

(Continued)

FOREIGN PATENT DOCUMENTS

CN    110704164 A    1/2020

OTHER PUBLICATIONS

Daigle, "Building Twelve Factor Apps on Heroku", Aug. 15, 2013, 4 pps, © 2021 Salesforce.com, <https://blog.heroku.com/twelve-factor-apps>.

(Continued)

*Primary Examiner* — Kostas J Katsikis
(74) *Attorney, Agent, or Firm* — Stephen R. Yoder

(57) ABSTRACT

Aspects of the present invention disclose a method for deploying an application in a computing environment receiving an application module, determining values of a first set of metadata for the received application module, determining a classification of the received application module based at least in part on the values of the first set of metadata, and determining whether the received application is deployable in at least an off-premise system based at least in part on the classification.

19 Claims, 6 Drawing Sheets

(56) References Cited

U.S. PATENT DOCUMENTS

| | | | | |
|---|---|---|---|---|
| 2020/0264919 A1* | 8/2020 | Vukovic | ............. | H04L 67/34 |
| 2020/0311573 A1* | 10/2020 | Desai | ............. | H04L 41/147 |
| 2021/0150330 A1* | 5/2021 | Sharma | ............. | G06N 3/0454 |
| 2021/0304063 A1* | 9/2021 | Bulut | ............. | G06V 10/95 |
| 2022/0012627 A1* | 1/2022 | Arora | ............. | G06F 17/18 |
| 2022/0179769 A1* | 6/2022 | Wan | ............. | G06F 9/5061 |

OTHER PUBLICATIONS

"IBM cloud adoption and transformation", IBM, 3 pps., printed from the Internet on Apr. 8, 2021, <https://www.ibm.com/cloud/architecture/adoption>.

"Migrate and Modernize", IBM GTS Sales Enablement, 3 pps, printed from the Internet on Apr. 9, 2021, IBM GTS Sales Enablement, <https://bundles.yourlearning.ibm.com/ibm/gts-sales-enablement/#GYKGKJNNZRQX2726/EKRPNVMQEKRJ2PG2>.

"Multicloud management services", IBM, 5 pps., printed from the Internet on Apr. 8, 2021, <https://www.ibm.com/services/technology/platform-with-watson>.

"Our Clients' Journey to Cloud", 1 pp., IBM GTS Sales Enablement, printed fro the Internet on Apr. 9, 2021, <https://bundles.yourlearning.ibm.com/ibm/gts-sales-enablement/#GYKGKJNNZRQX2726/PZXGWNRGWKWQ2VQV>.

"The Cloud Opportunity IBM's approach", IBM GTS Sales Enablement, 3 pps, printed from the Internet on Apr. 9, 2021, <https://bundles.yourlearning.ibm.com/ibm/gts-sales-enablement/#GYKGKJNNZRQX2726/EKRJNKJPWNQJ3AKD>.

Mell et al., "The NIST Definition of Cloud Computing", National Institute of Standards and Technology, U.S. Department of Commerce, NIST Special Publication 800-145, Sep. 2011, 7 pages.

* cited by examiner

MACHINE LEARNING BASED APPLICATION DEPLOYMENT

BACKGROUND

The disclosure relates generally to the field of digital computer systems. The disclosure relates particularly to deploying an application in an environment comprising an on-premises system and off-premises system.

One of the most important imperatives for organizations may be to be able to move workloads from one environment to another as requirements change. For example, a workload might initially reside in a data center. However, if the application begins to require more compute and storage resources, the organization may decide to move application to a public cloud rather than acquiring more on-premises resources. In the journey to the cloud, organizations have to typically assess and decide for each and every business application, which may be intensive resource consuming.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable deploying an application in a computing environment.

Aspects of the invention disclose methods, systems, and computer readable media associated with deploying an application in a computing environment including receiving an application module, determining values of a first set of metadata for the received application module, determining a classification of the received application module based at least in part on the values of the first set of metadata, and determining whether the received application is deployable in at least an off-premise system based at least in part on the classification. In another aspect, the invention deploys the received application module based at least in part on the classification. In the present aspect, the invention can reduce decision errors and can thus save processing resources that would otherwise be required to deploy wrongly classified programs.

In another aspect, the invention disclose methods, systems, and computer readable media associated with deploying an application in a computing environment including, in response to determining that an application module is deployable in at least an off-premise system, determining values of a second set of metadata for the received application module, determining a type of computing environment of the off-premise system for deploying the application module based at least in part on the values of the second set of metadata, and deploying the application module based at least in part on the determined type. In the present aspect, the invention can enable to use a one-step approach to deploy the application module in a computing environment regardless of the type of the computing environment in which the application module is deployed.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
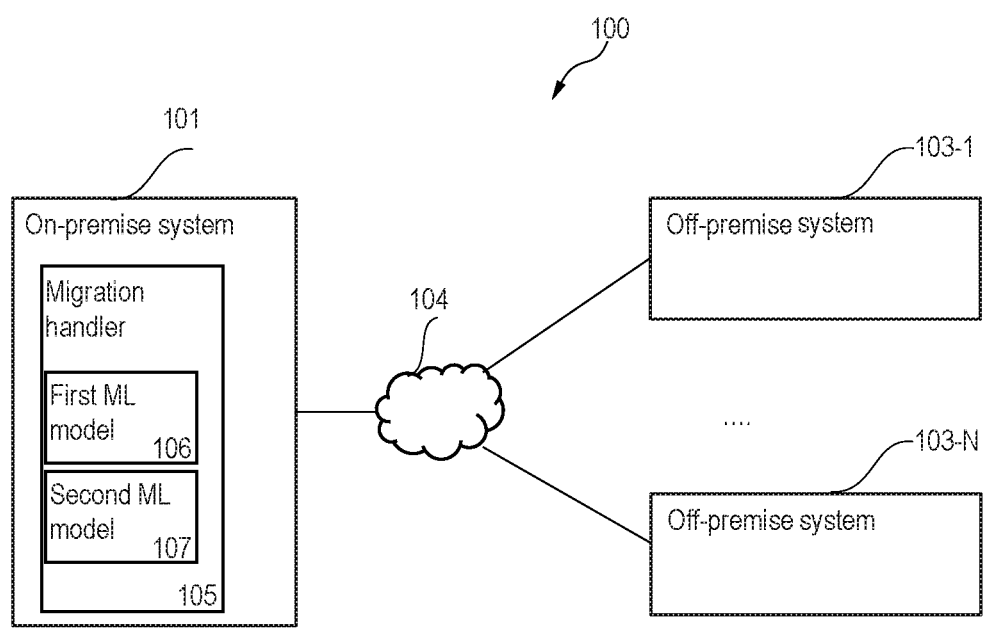
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention will be presented for purposes of illustration but are not intended to be exhaustive or limited to the embodiments disclosed.

A computing environment can consist of various numbers of computers devices arranged to solve computing issues. Different arrangements of the computing environment can provide different types of computing environments. The computing environment can, for example, comprise an on-premise system and at least one off-premise system. The on-premise system can be a local system on the premises of a user or organization for executing on-premise software. The off-premise system can be a remote system that is accessible e.g., by the user of the on-premise system, via a network and that may be owned by a third party. The arrangement of the on-premise system and/or the off-premise system can enable different types of computing environments. For example, the type of computing environment can be a client-server computing environment, in which the on-premise system can represent the client side and the off-premise system can represent the server side of this computing environment. In another example, the type of computing environment can be a hybrid cloud in which the off-premise system can represent a public cloud and the on-premise system is the other part of this computing environment.

The computing environment can be used to execute a computer program or software component. The computer program can be an application. The computer program can comprise one or more application modules. The execution of the computer program can comprise execution of at least part of the application modules. Before being executed, the computer program may need to be successfully deployed in the computing environment. Deployment of a computer program can be a process of installing the computer program to a target system of the computing environment from a given system. For example, the computer program can be deployed in the off-premise system from the on-premise system. However, software deployment may be a technically challenging task as the task can require a deep knowledge of the computing environment in which a computer program is to be deployed. This can usually involve multiple experts trying to determine whether a developed computer program is deployable or not deployable in the computing environment. This procedure can be very prone to errors and resource consuming e.g., the procedure can require a very long time until the computer program is determined to be deployable in particular for complex computing environments. In addition, the deployment of an application that was wrongly determined as being deployable can unnecessarily consume resources.

The present embodiments of the invention can solve the above issue by enabling an accurate and systematic method for deploying computer programs in computing environments. In particular, using machine learning models can reduce decision errors and can thus save processing resources that would otherwise be required to deploy wrongly classified programs. The present embodiments of the invention can further be advantageous by providing a controllable and improved input to the machine learning models. In particular, the metadata used as input to the machine learning model can be chosen dependent on the use cases. For example, the metadata of an application module can comprise descriptive information of the application module. The metadata can be characteristic of the application module, the value of which can automatically be determined and/or can be determined by a user. The first set of metadata can comprise a first set of characteristics of the application module. The values of the first set of metadata can be provided as a vector of values.

Hence, the present embodiment of the invention can enable a one-step approach to deploy the application module in a computing environment, regardless of the type of the computing environment in which the application module is deployed. However, the performance of the application module may be dependent on the type of the computing environment in which it is deployed e.g., the application module may be more performant in one type of computing environment compared to other types of computing environments. Usually, experts are requested to decide which type of computing environment can be used. For example, based on the nature of the workloads and many other constraints, the decision may have to be taken whether certain workloads should run on public or private cloud. However, the decision can be prone to error, due the complexity of the problem as many factors can affect the decision. The present embodiments of the invention can solve this issue by using an accurate and systematic method for determining a type of computing environment that is suitable for a deployable application module. This can be enabled by a two-step approach that supports the move of an existing client business application to the suitable type of computing environment by using multiple trained machine learning models. The first machine learning model can receive inputs of metadata of the application module. According to one embodiment, the method further comprises providing a second trained machine learning model configured to receive as inputs one or more values of a second set of metadata of an application, and based thereon, to select a type of computing environment of an off-premise system for running the application using the off-premise system. The application module is deployed in cases where the application module is deployable, wherein the deploying comprises: determining values of the second set of metadata for the application module, inputting the determined values of the second set of metadata into the second machine learning model for receiving a determination of a type of computing environment of an off-premise system for deploying the application module, and deploying the application module according to the determined type of computing environment. This embodiment may further be advantageous as it does not only consider where the application should be deployed, but also considers how well the application can perform, once the application is deployed.

According to one embodiment, the first set of metadata comprises at least part of the second set of metadata, preferably the first set of metadata being the second set of metadata, wherein in a case where the first set and second set are different, the determining of the values of the second set of metadata comprises determining values of non-overlapping metadata between the first set and second set, wherein in a case where the first set and second set are the same, the determining of the values of the second set of metadata comprises determining that the determined values of the first set are the values of the second set.

For example, the first set of metadata can include information that allows for correct installation and/or configuration of the application module e.g., in the off-premise system.

The first set and second set of metadata can be different in that the first set and second set can be partially overlapping or not overlapping. Partially overlapping means that the first set comprises a portion of the second set. Having different sets of metadata can be advantageous because the criteria to classify an application module as a deployable or not deployable application, may be different from the criteria for the assignment of the computing environment. That is, the first inference regarding classification of the application can rely on metadata that indicates whether the deploying is possible or not while the second inference regarding assignment may rely on metadata that is more performance related. For example, the memory usage may be of low importance (compared to other metadata) for deciding whether an application module is deployable or not, while for choosing the suitable type of computing environment, the memory usage may be of higher importance.

The first set and second set of metadata can be completely overlapping. That is, the first set of metadata and second set of metadata are the same, or the first set comprises the second set of metadata and additional metadata, or the second set comprises the first set of metadata and additional metadata. Using the completely overlapping sets of metadata as input for the machine learning models to save resources of producing and managing different sets of metadata.

According to one embodiment, the type of computing environment comprises any one of: client-server computing environment, private cloud computing environment, public cloud computing environment, hybrid cloud computing environment and cluster computing environment.

The user of the deployable application module may have more than one computing environment from which to choose. For example, the client server computing environment may be beneficial as the server can provide a function or service to multiple clients including the on-premise system, which initiate requests for such services. Although the application module may be deployable in both the private cloud computing environment and the client-server computing environment, the latter can be more suitable for the application module e.g., if the application module is a web application.

According to one embodiment, the method further comprises repeating the classification and the deploying of further received application modules, thereby deploying an application program comprising said application modules. Each application module of the application program can be an assembly for providing a respective computing function. For example, the functionality of the application program can be separated into independent modules, such that each contains everything necessary to execute one aspect of the desired functionality. This can enable a modular implementation of the application, which can be beneficial in case some aspects or modules can be shared among other application programs.

According to one embodiment, the method further comprises receiving a migration request to migrate the application module from the on-premise system to the off-premise system, wherein the method is performed in response to receiving the migration request. For example, the application module can be developed in the on-premise system and then migrated to the off-premise system. In this example, the application module is migrated to the off-premise through various paths (e.g., rehost, refactor, replatform, retire/replace, etc.) based on the application module's dependencies and technical requirements, as well as off-premise security, compliance, and cost constraints. This can enable an efficient development process, as the development can locally (and thus easily) be performed before the developed applications are used for production.

According to one embodiment, the method further comprises: receiving a first training set comprising multiple (e.g., a plurality) first sets of metadata of application modules, wherein each first set of metadata is labelled as being associated with an application module that is deployable or non-deployable in at least the off-premise system, training the untrained first machine-learning model on the first training set, thereby creating the first trained model.

The first machine learning model can be trained to classify the input application modules into two or more classes, wherein one class refers to a deployable application, and one or more classes refer to the non-deployable applications. The non-deployable applications can belong to more than one class. For example, a cloud native application can be considered non-deployable in the sense that the cloud native application is bundled together with the hardware of the cloud and thus the cloud native application may have already been deployed and there is no need to be processed according to the present embodiment e.g., in order to determine which hardware configuration to be used. Another class of the non-deployable application can be cloud enabled application class.

The training of the untrained first machine learning model comprises a backpropagation of an error of the classification of the application module as deployable or not deployable application. The learning of the learnable parameters (e.g., weights of a neural network) of the untrained first machine learning model can be updated based on the errors back propagated. The untrained first machine learning model can be trained in a supervised manner.

According to one embodiment, the method further comprises updating the first training set by the received application module and the associated classification, and using the updated first training set for retraining the trained first machine learning model. This embodiment can be beneficial as the embodiment keeps the migration process improving over time by regularly retraining the first model.

According to one embodiment, the method further comprises: receiving a second training set comprising multiple (e.g., a plurality) second sets of metadata of application modules, wherein each second set of metadata is associated with a type of computing environment of an off-premise system; training an untrained second machine-learning model on the second training set, thereby creating the second trained model. For example, each training set of the first training set and second training set of metadata annotations, may be weighted so that older annotations can be removed and newer ones can be used multiple times in the training set with the effect that newer annotations can have a stronger impact to the supervised machine learning approach.

For example, the second trained model can be used to classify received application modules. For example, three classes may be provided. A first class of an application module can indicate that the application module can suitably be deployed into a private cloud environment. A second class of an application module can indicate that the application module can suitably be deployed into a public cloud environment. A third class of an application module can indicate that the application module can suitably be deployed into a hybrid cloud environment. The training of the untrained second machine learning model comprises a backpropagation of an error of the classification of the application module. The learning of the learnable parameters (e.g., weights of a neural network) of the untrained second machine learning model can be updated based on the errors back propagated. The untrained second machine learning model may be trained in a supervised manner.

The first and second training sets can be generated by monitoring existing cloud systems to allow to train a supervised machine learning approach e.g., a neural network. The goal may be to get the system trained to separate the training data in different groups (classes). This separation can be based on the metadata of the individual application module metadata with the pre-annotated training data. The two models can later be used to manage application modules placement based on data classification of the application modules' metadata.

According to one embodiment, the method further comprises updating the second training set by the received application module and the associated computing environment classification, and using the updated second training set for retraining the trained second machine learning model. This embodiment can be beneficial as the embodiment can keep the migration process improving over time by regularly retraining the second model.

According to one embodiment, the method further comprises, in case the application module is classified as non-deployable application module, performing an off-premise migration technique in order to process the application module, and repeating the classification and the deploying for the processed application module, wherein the off-premise migration technique comprises refactoring the application module. For example, refactoring can include making fairly significant changes to the application module so that the application module can scale or perform better in a cloud environment. Additionally, refactoring may involve recoding major portions of the application module to take advantage of cloud native functionalities-such as restructuring a monolithic application into a set of microservices or modernizing the data store from SQL to NoSQL.

According to one embodiment, the off-premise system is a cloud, wherein the type of computing environment of the off-premise system comprises any one of: private cloud, public cloud or hybrid cloud, wherein the second trained machine learning model is configured to determine one of the private cloud, public cloud and hybrid cloud for the deployment of the input application module.

According to one embodiment, the first trained machine learning model is a neural network having an input layer of nodes for receiving the first set of metadata respectively and an output layer of nodes representing the deployable and non-deployable applications, wherein at least one node of the output layer represents the non-deployable applications.

According to one embodiment, the second trained machine learning model is a neural network having an input layer of nodes for receiving the second set of metadata respectively and an output layer of nodes representing the type of computing environment of the off-premise system. The neural network can, for example, be an artificial neural network (ANN).

According to one embodiment, the metadata of the first set of metadata or of the second set of metadata indicates any one of: response time, latency, error rate, saturation, bandwidth usage, memory usage, whether the application module is containerized, whether the application module is microservices oriented, whether the application module uses data decoupling, whether the application module is operating system independent.

The term "machine learning" (ML) refers to a computer algorithm used to extract useful information from training data sets by building probabilistic models (referred to as machine learning models or "predictive models") in an automated way. Machine learning algorithms build a mathematical model based on sample data, known as "training data", in order to make predictions or decisions without being explicitly programmed to perform the task. The machine learning can be performed using a learning algorithm such as supervised or unsupervised learning, clustering, classification, linear regression, reinforcement algorithm, self-learning, etc. The machine learning can be based on various techniques such as clustering, classification, linear regression, support vector machines, neural networks, etc. A "model" or "predictive model" can for example be a data structure or program such as a neural network, a support vector machine, a decision tree, a Bayesian network etc. The model is adapted to predict an unmeasured value (e.g., which tag corresponds to a given token) from other, known values and/or to predict or select an action to maximize a future reward.

A deployable application can be an application that fulfills the software portability criterion. The software portability can refer to the usability of the same software in different environments. Software which is not portable in this sense may have to be transferred with modifications to support the environment on the destination machine. A deployable application can enable the same functionality for several computing platforms without having to be redesigned or refactored. For example, the application module is deployable in the off-premise system if the application module is designed to run on different computers with compatible operating systems and processors, without any machine-dependent installation. The deployable application can be referred to as ready application in that the deployable application can be ready to be deployed in the target environment e.g., the deployable application can be ready to be moved to a cloud.

FIG. 1 is a schematic illustration of a computing environment 100 in accordance with an example of an embodiment of the invention.

The present invention may contain various accessible data sources, such as on-premise system 101 and off-premise systems 103-1 through 103-N, that may include personal data, content, or information the user wishes not to be processed. Personal data includes personally identifying information or sensitive personal information as well as user information, such as tracking or geolocation information. Processing refers to any, automated or unautomated, operation, or set of operations, such as collection, recording, organization, structuring, storage, adaptation, alteration, retrieval, consultation, use, disclosure by transmission, dissemination, or otherwise making available, combination, restriction, erasure, or destruction performed on personal data. Migration handler 105 enables the authorized and secure processing of personal data. Migration handler 105 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Migration handler 105 provides information regarding personal data and the nature (e.g., type, scope, purpose, duration, etc.) of the processing. Migration handler 105 provides the user with copies of stored personal data. Migration handler 105 allows the correction or completion of incorrect or incomplete personal data. Migration handler 105 allows the immediate deletion of personal data.

The computing environment 100 comprises various types of systems such as an on-premise system 101 and off-premise systems 103-1 through 103-N. FIG. 1 is merely provided for illustration purposes. The computing environment 100 may include more or fewer systems than that illustrated in FIG. 1, such as more on-premise systems and/or more off-premise systems. The on-premise system 101 and the off-premise systems 103-1 through 103-N may communicate via a network 104, such as the Internet or other public or private network.

The off-premise systems 103-1 through 103-N may provide IT services and apportioned resource(s) which are remotely located from the clients, off-premise. Each of the off-premise systems 103 may have a collection of resources comprising a hardware level set of resource servers for delivering computing components needed to instantiate a virtual machine, process, service, or other resource. The set of resource servers can, for example, host and serve applications or other software to load on an instantiation of a virtual machine, such as an email client, a browser application, a messaging application, or other applications, software, or services. At least part of the off-premise systems 103-1 through 103-N can comprise a cloud environment such as a public cloud and private cloud.

The on-premise system 101 can be on the premises of one or more clients. The on-premise system 101 can, for example, be provided as a local area network with a set of servers and client machines, and/or other machines or resources. The on-premise system 101 can comprise a migration handler 105. The migration handler 105 can be configured to perform at least part of the present subject matter. The migration handler 105 can comprise a first trained machine learning model 106 and a second trained machine learning model 107. The migration handler 105 can be configured to use at least one of the first trained machine learning model 106 and second trained machine learning model 107 in order to migrate or deploy an application module in an environment involving the off-premise systems 103. The first and second trained machine learning models 106 and 107 can, for example, be obtained as described with reference to FIGS. 4A and 5.

The computing environment 100 can enable multiple types of computing environments. A type of computing environment can be defined by one of the on-premise and off-premise systems 101 and 130-1 through 130-N or by different combinations of the off-premise system(s) and/or on-premise system. For example, a combination of two off-premise systems such as a public cloud and private cloud can provide one type of computing environment, which may be a hybrid cloud etc. One or more types of computing environments can belong to the same sub-computing environment e.g., the public cloud, private cloud and hybrid cloud can belong to the cloud environment. Another common type of computing environment is the community cloud. The community cloud can be a cloud infrastructure that is shared by users of the same industry or by those who have common goals. This cloud infrastructure is built after understanding the computing needs of a community as there are many factors including compliances and security policies that may need to be included in the community cloud infrastructure.

Figure 2:
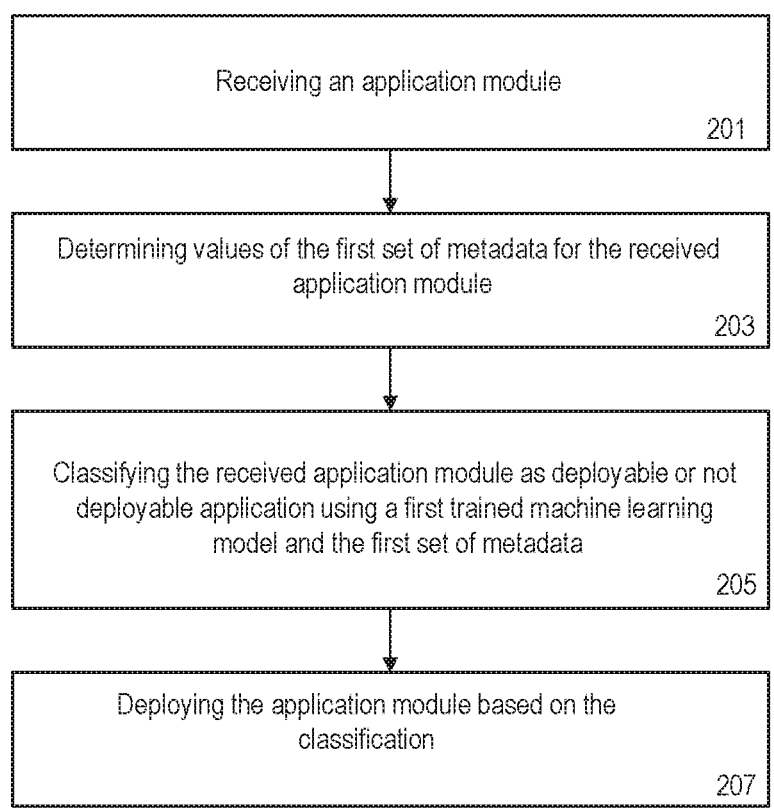
FIG. 2 provides a flowchart depicting an operational sequence for deploying an application module, according to an embodiment of the invention.

FIG. 2 is a flowchart of a method for deploying an application module in accordance with an example of the present embodiment of the invention. For the purpose of explanation, the method described in FIG. 2 may be implemented in the system illustrated in FIG. 1, but is not limited to this implementation. The method of FIG. 2 may, for example, be performed by the migration handler 105.

In an embodiment, the method receives an application module in step 201. For example, a request to process the application module according to the method is received in step 201. The request comprises the application module. In another example, the application module can include an existing or a newly developed and stored application module that is automatically received in step 201. The method enables migration of the application module into a target computing environment.

In an embodiment, the method determines values of a first set of metadata for the received application module in step 203. For example, the first set of metadata comprises n1 metadata $M_1^1, M_2^1, M_3^1 \ldots M_{n1}^1$, where n1≥1. The first set of metadata can, for example, be defined by one or more users, e.g., experts, such that the first set of metadata accurately describes different aspects related to the usage and execution of the application modules. The first set of metadata, for example, comprises metadata that can be automatically evaluated. In another example, the first set of metadata comprises metadata that can be evaluated by prompting a user to provide values with the method receiving the values in response to the prompting. The method collects the values of the first set of metadata from different data sources such as runtime tools and data probes, configuration files, documentations, expert input, and customer support input.

In an embodiment, the method inputs the determined values of the first set of metadata into the first model 106, and receives, in step 205, a classification of the received application module as a deployable or non-deployable application module. For example, the method determines whether the application module can be deployed in at least part of the types of computing environments which are enabled by the computing environment 100. For example, the method determines, based on the classification of the first model 106, that the application module is deployable in a cloud environment as provided by the computing environment 100. The cloud environment can include the public cloud, the private and/or the hybrid cloud. That is, the application module can be deployable in any of the public cloud, the private cloud and the hybrid cloud.

Figure 3:
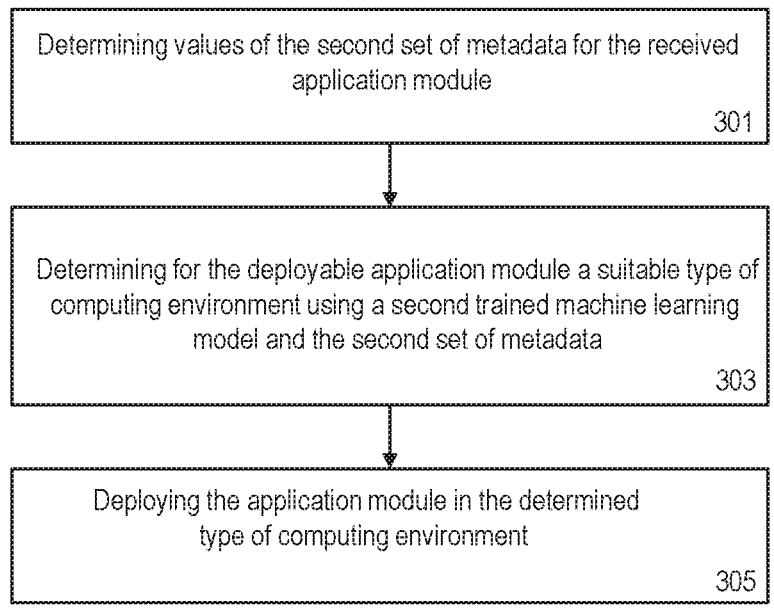
FIG. 3 provides a flowchart depicting an operational sequence for deploying an application module, according to an embodiment of the invention.

In case the method determines that the application module is deployable, the application module can be deployed in step 207. For example, the method can deploy the application module in one of the public cloud, the private cloud, and the hybrid cloud, if the method determines the application module is deployable in the cloud environment. For example, the method can select one of the three types of cloud environments randomly in order to deploy the application module. FIG. 3 provides another example for choosing the suitable type of computing environment for deploying the application module. If the method determines that the application module is a non-deployable application, the application module can be processed e.g., by refactoring the application module, and steps 203 to 207 may be repeated for the processed application. The repetition can, for example, be performed until the processed application module is determined to be deployable or until a predefined maximum number of iterations is reached.

FIG. 3 is a flowchart of a method for deploying an application module in accordance with an example of the present embodiments of the invention. For the purpose of explanation, the method described in FIG. 3 may be implemented in the system illustrated in FIG. 1, but is not limited to this implementation. The method of FIG. 3 can, for example, be performed by the migration handler 105. The method of FIG. 3 provides further details of step 207 of FIG. 2.

In an embodiment, the method determines values of a second set of metadata of the application module in step 301. The application module for which the second set of metadata is evaluated is an application module that is deployable in the computing environment e.g., environment 100. The application module can, for example, be deployable in the cloud environment. For example, the second set of metadata can comprise n2 metadata $M_1^2, M_2^2, M_3^2 \ldots M_{n2}^2$, where n2≥1. The values of the second set of metadata may be determined as described with reference to the first set of metadata. For example, the values of the second set of metadata can be collected from one or more data sources such as runtime tools and data probes, configuration files, documentations, expert input and customer support.

In an embodiment, the method inputs the determined values of the second set of metadata into the second machine learning model 107 for receiving, in step 303, a determination of a type of computing environment of the off-premise system for deploying the application module. For example, the method utilizes the second machine learning model 107 to determine which type of the computing environment of the cloud environment is suitable for the application module.

In an embodiment, the method deploys the application module in the determined type of computing environment in step 305.

Figure 4A:
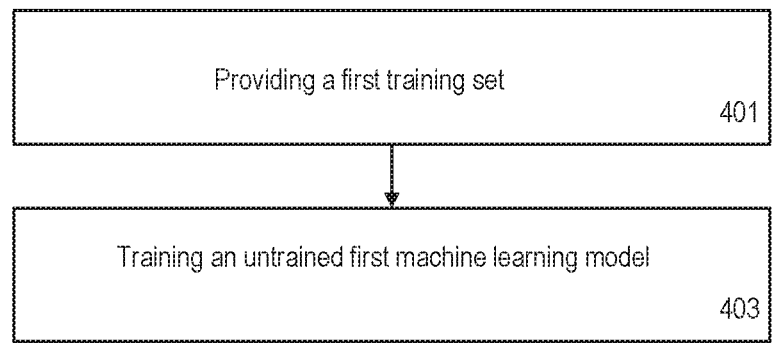
FIG. 4A provides a flowchart depicting an operational sequence for training an untrained first machine learning model, according to an embodiment of the invention.

FIG. 4A is a flowchart of a method for training a machine learning model in accordance with an example of the present subject matter. For the purpose of explanation, the method described in FIG. 4A may be implemented in the system illustrated in FIG. 1, but is not limited to this implementation. The method of FIG. 4A may, for example, be performed by the migration handler 105.

Figure 4B:
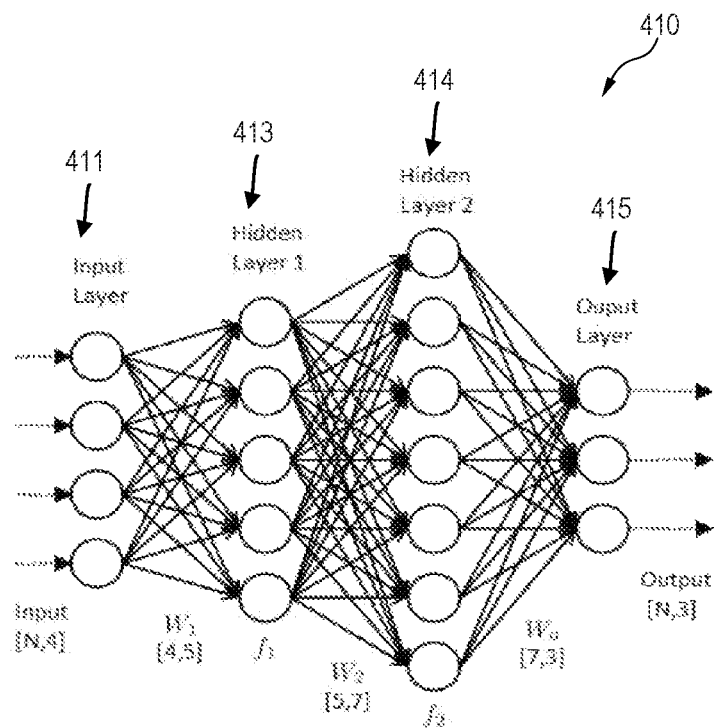
FIG. 4B depicts a neural network, according to an embodiment of the invention.

The machine learning model may be an artificial neural network as shown in FIG. 4B, but it is not limited to, as other algorithms can be trained to perform the present classifications. FIG. 4B shows an example ANN 410 in accordance with the present embodiment of the invention. The ANN 410, for example, includes an input layer 411, hidden layers 413 and 414, and an output layer 415. The input layer 411 has four input neurons being configured to receive values of the respective four metadata. The first hidden layer 413 comprise five neurons and the second hidden layer 414 comprises seven neurons. The output layer 415 has number of neurons that corresponds to the number of classes so that each output neuron is associated with a respective class. The ANN 410 comprises connections between each layer. Each connection of the connections may be assigned a weight that represents the connection's relative importance. The weights of the ANN 410 can comprise a weight matrix $W_1$ of weights between the input layer 411 and the first hidden layer 413, wherein $W_1$ is a 4×5 matrix. The weights of the ANN 410 can further comprise a weight matrix $W_2$ of weights between the first hidden layer 413 and the second hidden layer 414, wherein $W_2$ is a 5×7 matrix. The weights of the ANN 410 can further comprise a weight matrix $W_o$ of weights between the second hidden layer 414 and the output layer 415, wherein $W_o$ is a 7×3 matrix.

In an embodiment, the method provides a first training set in step 401. The first training set comprises multiple first sets of metadata of application modules. For example, the first training set can comprise multiple entries wherein each entry comprises a first set of metadata in association with a label indicating whether the application module is deployable or not deployable. The first training set can, for example, comprise the following pairs:

$$\left(V^1_{M^1_1,M^1_2,M^1_3...M^1_{n1}}, y_1\right), \left(V^2_{M^1_1,M^1_2,M^1_3...M^1_{n1}}, y_2\right),$$
$$\left(V^3_{M^1_1,M^1_2,M^1_3...M^1_{n1}}, y_3\right) ... \left(V^p_{M^1_1,M^1_2,M^1_3...M^1_{n1}}, y_p\right),$$

where $$V^i_{M^1_1,M^1_2,M^1_3...M^1_{n1}}$$

refers to a vector of values of the first set of metadata and $y_i$ refers to the label. The dimension of the input vector can be the size of the input layer in terms of number of neurons. Following the example of FIG. 4B, the input vectors can each comprise four values of four metadata i.e., n1=4.

In one example, the method generates the first training set using one or more sources of data. The sources can, for example, comprise: runtime tools and data probes, configuration files, documentation files, user inputs, and customer support input. The first training set can, for example, be generated by monitoring existing cloud environments. For example, existing and running deployable application modules can be analysed in order to evaluate the first set of metadata. The values of the first set of metadata of existing and running deployable application modules can be associated with a label indicating that the existing and running deployable application modules are deployable. Similarly, existing application modules which are not deployable, and which require, for example, reformatting can be analysed in order to evaluate the first set of metadata. The values of the first set of metadata of the existing and non-deployable application modules can be associated with a label indicating that the existing and non-deployable are not deployable. This can result in labelled data which forms the first training set and that can be used to train the first machine learning model.

In an embodiment, the method trains an untrained machine-learning model using the second training set in step 403. This can create the second trained model.

For example, the ANN 410 may correspond to a function y=fN (w,x) which, given a weight set w, maps an input x to an output y. The weight set w comprises weight matrices $W_1$, $W_2$ and $W_o$ as described above. The training or optimization of the ANN 410 takes as input a sequence of training examples $$\left(x_1 = V^1_{M^1_1,M^1_2,M^1_3...M^1_{n1}}, y_1\right), \left(x_2 = V^2_{M^1_1,M^1_2,M^1_3...M^1_{n1}}, y_2\right),$$
$$\left(x_3 = V^3_{M^1_1,M^1_2,M^1_3...M^1_{n1}}, y_3\right) ... \left(x_P = V^p_{M^1_1,M^1_2,M^1_3...M^1_{n1}}, y_P\right)$$

and produces a sequence of weight sets $w_1, \ldots, w_p$ starting from an initial weight set $w_0$. The weight sets $w_1, \ldots, w_p$ may be computed as follows: the weight set $w_i$ is computed using only the weight set $w_{i-1}$ of the previous iteration and the associated training example: $(x_1, y_1, w_{i-1})$ for i=1, ..., p. The computation of the weight sets is the same in each step, hence only the case i=1 is described herein. Calculating, for example, the weight set $w_1$ from $(x_1, Y_1, w_0)$ is done by considering a variable weight w and applying gradient descent to the function $w \mapsto E$ (fN (w, $x_1$), $y_1$) to find a local minimum, starting at $w=w_0$. This makes $w_1$ the minimizing weight found by gradient descent. The output of the training is then the weight set $w_p$, resulting in or defining a new function $y \mapsto fN (w_p, x)$.

Figure 5:
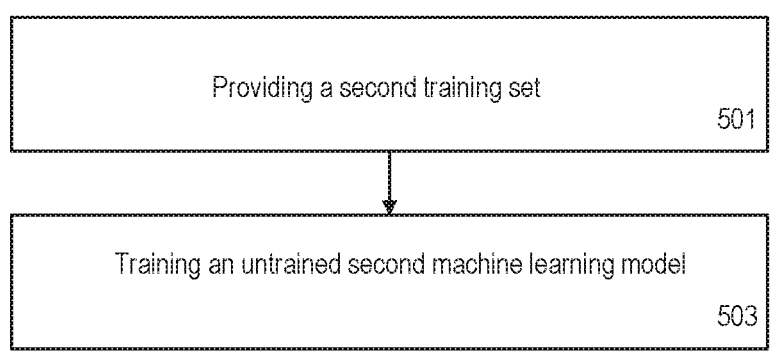
FIG. 5 provides a flowchart depicting an operational sequence for training an untrained second machine learning model, according to an embodiment of the invention.

FIG. 5 is a flowchart of a method for training a machine learning model in accordance with an example of the present embodiment of the invention. For the purpose of explanation, the method described in FIG. 5 may be implemented in the system illustrated in FIG. 1, but is not limited to this implementation. The method of FIG. 5 can, for example, be performed by the migration handler 105.

In an embodiment, the method provides a second training set in step 501. The second training set comprises multiple second sets of metadata of application modules, wherein each second set of metadata is associated with a type of computing environment of the off-premise system. The training set can, for example, comprise the following pairs:

$$\left(V^1_{M^2_1,M^2_2,M^2_3...M^2_{n2}}, env_1\right), \left(V^2_{M^2_1,M^2_2,M^2_3...M^2_{n2}}, env_2\right),$$
$$\left(V^3_{M^2_1,M^2_2,M^2_3...M^2_{n2}}, env_3\right) ... , \text{ where } V^i_{M^2_1,M^2_2,M^2_3...M^2_{n2}}$$

refers to a vector of values of the second set of metadata and $env_i$ refers to a type of computing environment. If, for example, the second trained model is an ANN as described with reference to FIG. 4B, the number of metadata in the second set may be four metadata i.e., n2=4, because the number of neurons in the input layer is four.

In an embodiment, the method trains an untrained second machine-learning model using the second training set in step 503. This creates the second trained model. In case the second trained model is an ANN, the training can be performed as explained with reference to FIG. 4A.

The following is a list of example metadata (listed by names) that may be part of the first set or second set of metadata described herein.

Containerized. This metadata indicates whether each part (applications, processes, etc.) is packaged in its own container.

Dynamically Orchestrated. This metadata indicates whether containers are actively scheduled and managed to optimize resource utilization. Orchestration tools can, for example, be Kubernetes, Apache Mesos, Docker Swarm, Nomad, etc.

Microservices-Oriented. This metadata indicates whether applications are segmented into microservices.

Pricing. This metadata indicates the pricing level. For example, cloud-native applications may require no hardware or software investments as they are made on the cloud and are generally available on the licensee, thus relatively cheaper to use.

Centred around APIs for interaction and collaboration. This metadata indicates whether there is use of lightweight APIs that are based on protocols such as representational state transfer (REST), etc.

Data Decoupling. This metadata indicates of whether the application provide data decoupling.

Isolated from server and operating system dependencies. This metadata indicates whether the application is isolated from server and operating system dependencies.

Managed through agile DevOps processes. This metadata indicates whether the application is managed through DevOps processes. For example, each service of a cloud-native application goes through an independent life cycle, which is managed through an agile DevOps process.

Defined, policy-driven resource allocation. This metadata indicates whether the application uses a defined policy-driven resource allocation. For example, cloud-native applications align with the governance model defined through a set of policies. They adhere to policies such as central processing unit (CPU) and storage quotas, and network policies that allocate resources to services. For example, in an enterprise scenario, central IT can define policies to allocate resources for each department.

Response time. This metadata indicates the response time associated with the application.

Latency. This metadata indicates the latency associated with the application.

Error rate. This metadata indicates the error rate associated with the application.

Saturation. This metadata indicates the saturation associated with the application.

Other metadata may further indicate whether: the application is built in house using legacy infrastructure e.g., the entire application is built once the component is upgraded; the application is tweaked to be made remotely available in the cloud; the application is made on in house servers i.e., the application does not have any multi-tenant instances; the application requires manual upgrades causing disruption and shutdown to the application; the application has dependency on the operating systems as well as the hardware; the application has custom configuration for specific runtime environment; and the monitoring infrastructure is resource-centric monitoring (file system, processes, memory).

Further metadata may include the following metadata:

Operational cost license. For example, if market shifts impact the costs that a vendor is charging, the model can identify alternatives in deployment models or hosting options.

Maintenance cost. For example, applications may be kept in on-premises but exposed through an API gateway so that they can be consumed by newer applications. This may especially be true of a strategy of containing costs by limiting additional feature development on applications that are costly or difficult to maintain.

The present disclosure further comprises the following clauses.

Clause 1. A computer-implemented method for deploying an application in an environment comprising an on-premise system and off-premise system, the method comprising: providing a first trained machine learning model that is configured to receive as input values of a first set of metadata of an application and based thereon to classify the application as a deployable application or non-deployable application at least in the off-premise system; receiving an application module; determining values of the first set of metadata for the received application module; inputting the determined values of the first set of metadata to the first model, thereby receiving a classification of the received application module as a deployable or non-deployable application module; and deploying the application module based on the classification.

Clause 2. The method of clause 1, further comprising: providing a second trained machine learning model that is configured to receive as input values of a second set of metadata of an application and based thereon to select a type of computing environment of the off-premise system for running the application using the off-premise system; wherein the application module is deployed in case the application module is deployable, wherein the deploying comprises: determining values of the second set of metadata for the application module, inputting the determined values of the second set of metadata to the second machine learning model for receiving a determination of a type of computing environment of the off-premise system for deploying the application module, and deploying the application module according to the determined type of computing environment.

Clause 3. The method of clause 2, the first set of metadata comprising at least part of the second metadata, preferably the first set of metadata being the second set of metadata, wherein in case the first set and second set are different, the determining of the values of the second set of metadata comprises determining values of non-overlapping metadata between the first set and second set, wherein in case the first set and second set are the same, the determining of the values of the second set of metadata comprises determining that the determined values of the first set are the values of the second set.

Clause 4. The method of clause 2, wherein the type of computing environment comprises any one of: client server computing environment, private cloud computing environment, public cloud computing environment, hybrid cloud computing environment and cluster computing environment.

Clause 5. The method of any of the preceding clauses 1 to 4, further comprising repeating the classification and the deploying of further received application modules, thereby deploying an application program comprising said application modules.

Clause 6. The method of any of the preceding clauses 1 to 5, further comprising receiving a migration request to migrate the application module from the on-premise system to the off-premise system, wherein the method is performed in response to receiving the migration request.

Clause 7. The method of any of the preceding clauses 1 to 6, further comprising: receiving a first training set comprising multiples first sets of metadata of application modules, wherein each first set of metadata is labelled as being associated with an application module that is deployable or non-deployable in the off-premise system; training the untrained first machine-learning model on the first training data, thereby creating the first trained model.

Clause 8. The method of clause 7, further comprising updating the first training set by the received application module and the associated classification, and using the updated first training set for retraining the untrained first machine learning model.

Clause 9. The method of any of the preceding clauses 2 to 8, further comprising: receiving a second training set comprising multiples second sets of metadata of application modules, wherein each second set of metadata is associated with a type of computing environment of the off-premise system; training an untrained second machine-learning model on the second training set, thereby creating the second trained model.

Clause 10. The method of clause 9, further comprising updating the second training set by the received application module and the associated computing environment, and using the updated second training set for retraining the untrained second machine learning model.

Clause 11. The method of any of the preceding clauses 1 to 10, further comprising in case the application module is classified as non-deployable application module performing a an off-premise migration technique in order to process the application module, and repeating the classification and the deploying for the processed application module, wherein the off-premise migration technique comprises refactoring the application module.

Clause 12. The method of any of the preceding clauses 2 to 11, the off-premise system being a cloud, wherein the type of computing environment of the off-premise system comprises any one of: private cloud public cloud or hybrid cloud, wherein the second trained machine learning model is configured to determine one of the private cloud, public cloud and hybrid cloud for the deployment of the input application module.

Clause 13. The method of any of the preceding clauses 1 to 12, the first trained machine learning model being a neural network having an input layer of nodes for receiving the first set of metadata respectively and an output layer of nodes representing the deployable and non-deployable applications, wherein at least one node of the output layer represents the non-deployable applications.

Clause 14. The method of any of the preceding clauses 2 to 13, the second trained machine learning model being a neural network having an input layer of nodes for receiving the second set of metadata respectively and an output layer of nodes representing the type of computing environment of the off-premise system.

Clause 15. The method of any of the preceding clauses 1 to 14, wherein the metadata of the first set of metadata indicates any one of: response time, latency, error rate, saturation, memory usage, whether the application module is containerized, whether the application module is microservices oriented, whether the application module uses data decoupling, whether the application module is operating system independent.

Figure 6:
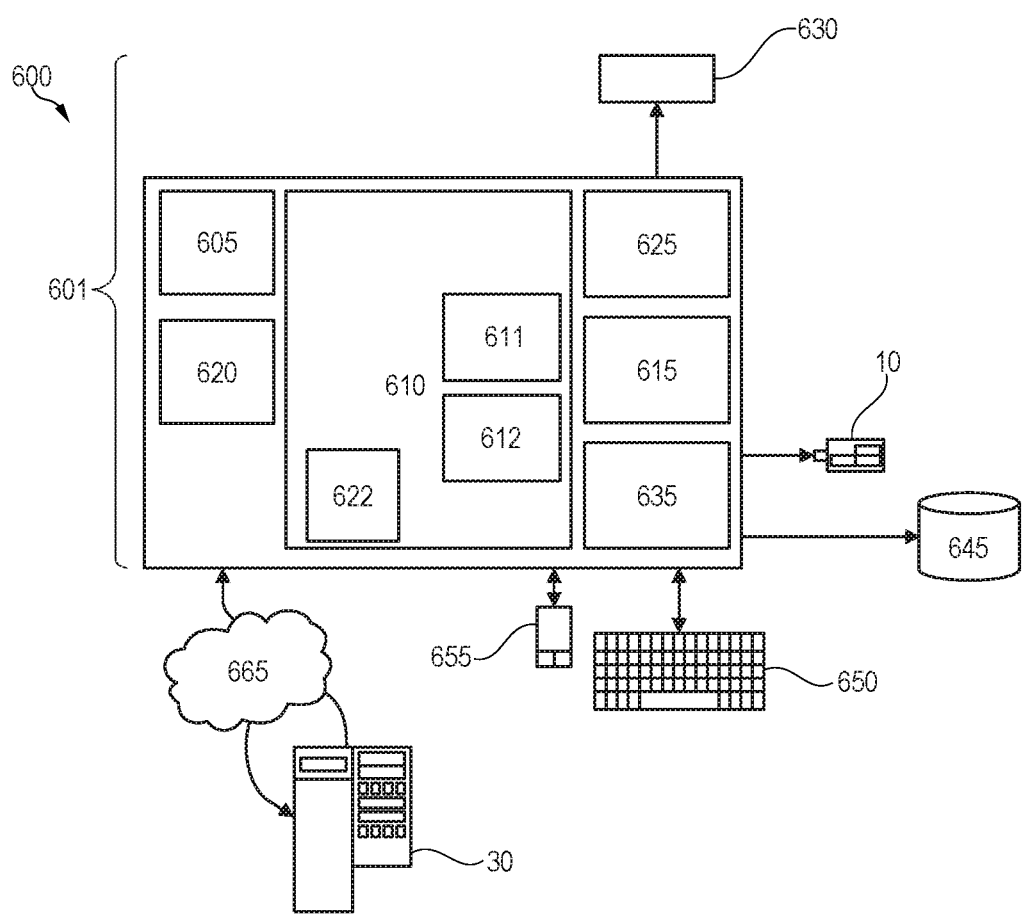
FIG. 6 depicts a computerized system, suited for implementing one or more method steps, according to an embodiment of the invention.

FIG. 6 represents a computerized system 600 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 can have additional elements, which are omitted for simplicity, such as controllers, buffers (caches), drivers, repeaters, and receivers, to enable communications. Further, the local interface can include address, control, and/or data connections to enable appropriate communications among the aforementioned components. As described herein the I/O devices 10, 645 can generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 can include one or more separate programs, each of which comprises an ordered listing of executable instructions for implementing logical functions, notably functions involved in embodiments of this invention. In the example of FIG. 6, software in the memory 610 includes instructions 612 e.g. instructions to manage databases such as a database management system.

The software in memory 610 shall also typically include a suitable operating system (OS) 411. The OS 611 essentially controls the execution of other computer programs, such as possibly software 612 for implementing methods as described herein.

The methods described herein be in the form of a source program 612, executable program 612 (object code), script, or any other entity comprising a set of instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 can include input devices, for example but not limited to a printer, a scanner, microphone, and the like. Finally, the I/O devices 10, 645 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 can be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 can be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 can further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods can be stored on any computer readable medium, such as storage 620, for use by or in connection with any computer related system or method. The storage 620 can comprise a disk storage such as HDD storage.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
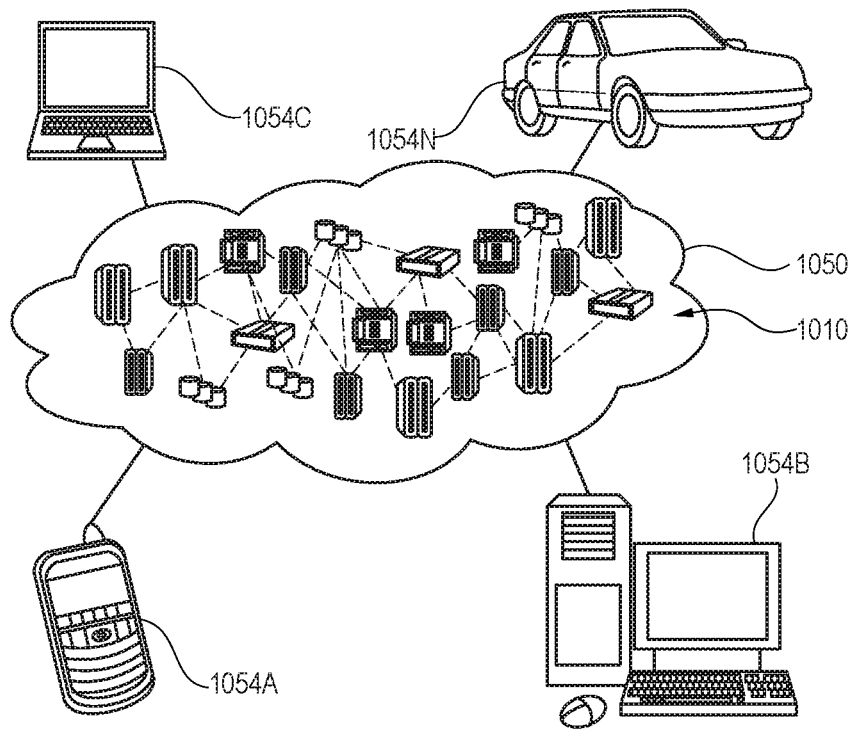
FIG. 7 depicts a cloud computing environment, according to an embodiment of the invention.

Referring now to FIG. 7, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 54N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 7 are intended to be illustrative only and that computing nodes 1010 and cloud computing environment 1050 can communicate with any type of computerized device over any type of network and/or network addressable connection (e.g., using a web browser).

Figure 8:
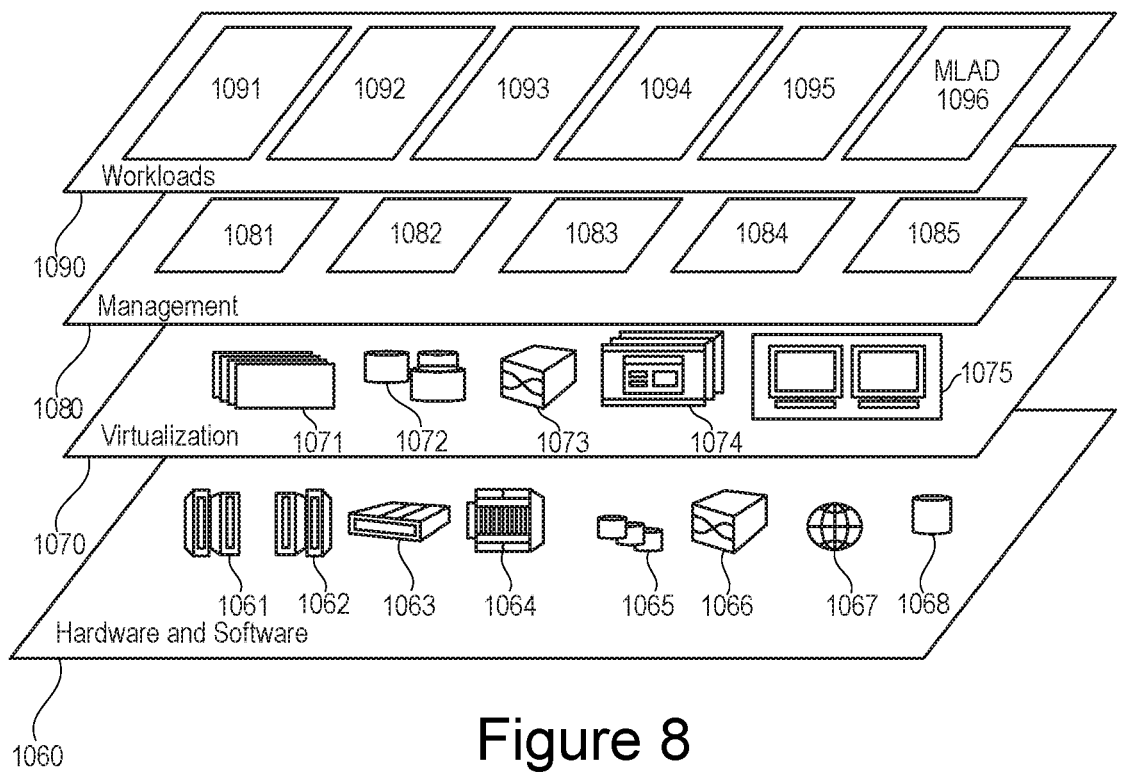
FIG. 8 depicts abstraction model layers, according to an embodiment of the invention.

Referring now to FIG. 8, a set of functional abstraction layers provided by cloud computing environment 1050 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and machine learning based application deployment (MLAD) 1096 in accordance with the present disclosure e.g., as described with reference to FIG. 2, 3, 4A, or 5.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for deploying an application in a computing environment, the method comprising:
   receiving an application module;
   determining values of a first set of metadata for the received application module;
   creating a first training set comprising a plurality of first sets of metadata corresponding to a plurality of application modules, wherein each first set of metadata of the plurality of first sets of metadata are labelled as being associated with a class, wherein the class is selected from a group consisting of: deployable in the off-premise system and non-deployable in the off-premise system;
   training a first machine-learning model on the first training set;
   inputting the determined values of the first set of metadata into the first machine learning model;
   determining a classification of the received application module based at least in part on the values of the first set of metadata; and
   determining whether the received application is deployable in at least an off-premise system based at least in part on the classification.

2. The computer-implemented method of claim 1, further comprising:
   deploying the received application module based at least in part on the classification.

3. The computer-implemented method of claim 1, further comprising:
   receiving a migration request to migrate the received application module from an on-premise system to the off-premise system.

4. The computer-implemented method of claim 1, further comprising:
   in response to determining that the received application is not deployable in at least the off-premise system based at least in part on the classification, performing an off-premise migration technique in order to process the received application module, wherein the off-premise migration technique comprises refactoring the received application module.

5. The computer-implemented method of claim 1, further comprising:
   updating the first training set based at least in part on the received application module and the classification; and
   retraining the first machine learning model based on the updated first training set.

6. The computer-implemented method of claim 1, wherein the first machine learning model is a neural network having an input layer of nodes for receiving the first set of metadata and an output layer of nodes representing classifications of application modules, wherein at least one node of the output layer represents a non-deployable application classification.

7. The computer-implemented method of claim 1, wherein metadata of the first set of metadata corresponds to a selection from a group consisting of: response time, latency, error rate, saturation, memory usage, whether the received application module is containerized, whether the received application module is microservices oriented, whether the received application module uses data decoupling, and whether the received application module is operating system independent.

8. A computer system for deploying an application in a computing environment, the
   computer system comprising:
   one or more computer processors;
   one or more computer readable storage devices; and
   stored program instructions on the one or more computer readable storage devices for execution by the one or more computer processors, the stored program instructions comprising:
   program instructions to receive an application module;
   program instructions to determine values of a first set of metadata for the received application module;
   in response to determining that the application module is deployable in at least an off-premise system, program instructions to determine values of a second set of metadata for the received application module;
   program instructions to create a second training set comprising a plurality of second sets of metadata corresponding to a plurality of application modules, wherein each second set of metadata of the plurality of second sets of metadata is associated with a computing environment type of the off-premise system;
   program instructions to train a second machine-learning model on the second training set;
   program instructions to input the determined values of the second set of metadata into the second machine learning model;
   program instructions to determine a type of computing environment of the off-premise system for deploying the application module based at least in part on the values of the second set of metadata; and
   program instructions to deploy the application module based at least in part on the determined type.

9. The computer system according to claim 8, wherein the type of computing environment is selected from a group consisting of: client server computing environment, private cloud computing environment, public cloud computing environment, hybrid cloud computing environment, and cluster computing environment.

10. A computer-implemented method for deploying an application in a computing environment, the method comprising:
    receiving an application module;
    determining values of a first set of metadata for the received application module;
    in response to determining that the received application module is deployable in at least an off-premise system, determining values of a second set of metadata for the received application module;
    creating a second training set comprising a plurality of second sets of metadata corresponding to a plurality of application modules, wherein each second set of metadata of the plurality of second sets of metadata is associated with a computing environment type of the off-premise system;
    training a second machine-learning model on the second training set;
    inputting the determined values of the second set of metadata into the second machine learning model;

determining a type of computing environment of the off-premise system for deploying the application module based at least in part on the values of the second set of metadata; and
deploying the application module based at least in part on the determined type.

11. The computer-implemented method of claim 10, wherein the type of computing environment is selected from a group consisting of: client server computing environment, private cloud computing environment, public cloud computing environment, hybrid cloud computing environment, and cluster computing environment.

12. The computer-implemented method of claim 10, further comprising:
updating the second training set based at least in part on the application module and the computing environment type; and
retraining the second machine learning model based on the updated second training set.

13. The computer-implemented method of claim 10, further comprising:
wherein the off-premise system is a cloud;
wherein the type of computing environment of the off-premise system is selected from a group consisting of: private cloud, public cloud, and hybrid cloud; and
wherein the second trained machine learning model is configured to determine a class associated with the type of computing environment of the off-premise system for the deployment of the received application module, wherein the class is selected from a group consisting of: private cloud, public cloud, and hybrid cloud.

14. The computer-implemented method of claim 10, wherein the second trained machine learning model is a neural network having an input layer of nodes for receiving the second set of metadata and an output layer of nodes representing the computing environment type of the off-premise system.

15. A computer program product for deploying an application in a computing environment, the computer program product comprising one or more computer readable storage devices and collectively stored program instructions on the one or more computer readable storage devices, the stored program instructions comprising:
program instructions to receive an application module;
program instructions to determine values of a first set of metadata for the received application module;
program instructions to create a first training set comprising a plurality of first sets of metadata corresponding to a plurality of application modules, wherein each first set of metadata of the plurality of first sets of metadata are labelled as being associated with a class, wherein the class is selected from a group consisting of: deployable in the off-premise system and nondeployable in the off-premise system;
program instructions to train a first machine-learning model on the first training set;
program instructions to input the determined values of the first set of metadata into the first machine learning model;
program instructions to determine a classification of the received application module based at least in part on the values of the first set of metadata; and
program instructions to determine whether the received application is deployable in at least an off-premise system based at least in part on the classification.

16. The computer program product according to claim 15, the stored program instructions further comprising:
program instructions to deploy the received application module based at least in part on the classification.

17. A computer program product for deploying an application in a computing environment, the computer program product comprising one or more computer readable storage devices and collectively stored program instructions on the one or more computer readable storage devices, the stored program instructions comprising:
program instructions to receive an application module;
program instructions to determine values of a first set of metadata for the received application module;
in response to determining that the application module is deployable in at least an off-premise system, program instructions to determine values of a second set of metadata for the received application module;
program instructions to create a second training set comprising a plurality of second sets of metadata corresponding to a plurality of application modules, wherein each second set of metadata of the plurality of second sets of metadata is associated with a computing environment type of the off-premise system;
program instructions to train a second machine-learning model on the second training set;
program instructions to input the determined values of the second set of metadata into the second machine learning model;
program instructions to determine a type of computing environment of the off-premise system for deploying the application module based at least in part on the values of the second set of metadata; and
program instructions to deploy the application module based at least in part on the determined type.

18. A computer system for deploying an application in a computing environment, the computer system comprising:
one or more computer processors;
one or more computer readable storage devices; and
stored program instructions on the one or more computer readable storage devices for
execution by the one or more computer processors, the stored program instructions comprising:
program instructions to receive an application module;
program instructions to determine values of a first set of metadata for the received application module;
program instructions to create a first training set comprising a plurality of first sets of metadata corresponding to a plurality of application modules, wherein each first set of metadata of the plurality of first sets of metadata are labelled as being associated with a class, wherein the class is selected from a group consisting of: deployable in the off-premise system and nondeployable in the off-premise system;
program instructions to train a first machine-learning model on the first training set;
program instructions to input the determined values of the first set of metadata into the first machine learning model;
program instructions to determine a classification of the received application module based at least in part on the values of the first set of metadata; and
program instructions to determine whether the received application is deployable in at least an off-premise system based at least in part on the classification.

19. The computer system according to claim 18, the stored program instructions further comprising:

program instructions to deploy the received application module based at least in part on the classification.

* * * * *